(12) United States Patent
Chen et al.

(10) Patent No.: US 7,611,205 B2
(45) Date of Patent: Nov. 3, 2009

(54) SAFETY SEAT ASSEMBLY (75) Inventors: Shun-Min Chen, Taipei (TW);
Jian-Qun Li, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 824 days.

(21) Appl. No.: 11/349,185

(22) Filed: Feb. 8, 2006

(65) Prior Publication Data
US 2007/0073464 A1 Mar. 29, 2007

(30) Foreign Application Priority Data
Sep. 27, 2005 (CN) ........................ 2005 2 0122053

(51) Int. Cl.
*B60N 2/46* (2006.01)
(52) U.S. Cl. .............................. 297/411.32; 297/411.2; 297/411.34; 297/411.38; 297/250.1
(58) Field of Classification Search .............. 297/411.2, 297/411.32, 411.34, 411.38, 411.45, 250.1
See application file for complete search history.

(56) References Cited
U.S. PATENT DOCUMENTS

| | | | | |
|---|---|---|---|---|
| 3,397,912 A * | 8/1968 | Bush | ...................... | 297/354.12 |
| 5,597,209 A * | 1/1997 | Bart et al. | .............. | 297/411.38 |
| 6,257,668 B1 * | 7/2001 | Chou et al. | ............ | 297/411.32 |
| 6,467,847 B2 * | 10/2002 | Bidare | .................... | 297/411.32 |
| 6,578,922 B2 * | 6/2003 | Khedira et al. | ......... | 297/411.32 |
| 6,682,143 B2 * | 1/2004 | Amirault et al. | ......... | 297/250.1 |
| 6,698,838 B2 * | 3/2004 | Kain | ..................... | 297/411.32 |
| 6,752,462 B1 * | 6/2004 | Kain et al. | ............. | 297/411.38 |
| 6,908,151 B2 * | 6/2005 | Meeker et al. | ........... | 297/250.1 |
| 7,140,688 B2 * | 11/2006 | Hann | ..................... | 297/411.32 |
| 7,185,952 B1 * | 3/2007 | Chen et al. | ............. | 297/411.38 |

* cited by examiner

*Primary Examiner*—Laurie K Cranmer
(74) *Attorney, Agent, or Firm*—Pillsbury Winthrop Shaw Pittman, LLP (57) ABSTRACT

A safety seat assembly includes a seat body and an armrest device. The seat body includes a seat portion and an armrest support disposed on a lateral side of the seat portion. The armrest device includes an armrest component connected pivotally to the armrest support, and a locking component disposed between the armrest component and the armrest support, coupled movably to the armrest component, and rotatable with the armrest component relative to the armrest support between first and second positions. The locking component is movable to engage the armrest support for retaining the armrest component at the first position. The armrest device further includes a control component operable between a locking position for preventing disengagement between the locking component and the armrest support, and an unlocking position for permitting disengagement between the locking component and the armrest support.

21 Claims, 9 Drawing Sheets

SAFETY SEAT ASSEMBLY

CROSS-REFERENCE TO RELATED APPLICATION

This application claims priority of Chinese application no. 200520122053.7, filed on Sep. 27, 2005.

BACKGROUND OF THE INVENTION

1. Field of the Invention

The invention relates to a seat assembly, more particularly to a juvenile safety seat assembly.

2. Description of the Related Art

A conventional juvenile safety seat assembly includes a seat body, and a pair of armrest units, each of which is connected pivotally to a respective lateral side of the seat body and is pivotable between lowered and raised positions relative to the seat body. Some conventional juvenile safety seat assemblies further include a safety belt device for restraining the juvenile seated on the seat body.

In addition, some conventional juvenile safety seat assemblies further include a locking mechanism for locking the armrest units at the lowered position. In view of the locked armrest units and the safety belt device, safety of the juvenile seated on the seat body can be ensured. By operating the locking mechanism to permit movement of the armrest units from the lowered position to the raised position, movement of a juvenile into and out of the seat body can be facilitated.

SUMMARY OF THE INVENTION

The object of the present invention is to provide a safety seat assembly including an armrest device that is pivotable between lowered and raised positions.

According to one aspect of the present invention, there is provided a safety seat assembly that comprises a seat body and an armrest device.

The seat body includes a seat portion and an armrest support disposed on a lateral side of the seat portion.

The armrest device includes an armrest component connected pivotally to the armrest support, and a locking component disposed between the armrest component and the armrest support, coupled movably to the armrest component, and rotatable with the armrest component relative to the armrest support.

The armrest component is pivotable between first and second positions relative to the armrest support.

The locking component is movable relative to the armrest support to an engaging position, where the locking component engages the armrest support to retain the armrest component at the first position.

The armrest device further includes a control component operable between a locking position, where the control component prevents movement of the locking component away from the engaging position, and an unlocking position, where the control component permits movement of the locking component away from the engaging position so as to permit movement of the armrest component between the first and second positions.

According to another aspect of the present invention, there is provided a safety seat assembly that comprises a seat body and an armrest device.

The seat body includes a seat portion and an armrest support disposed on a lateral side of the seat portion. The armrest support has a side surface formed with a notch.

The armrest device includes an armrest component connected pivotally to the armrest support and formed with a slot therethrough, and a locking component disposed between the armrest component and the armrest support, coupled movably to the armrest component, and rotatable with the armrest component relative to the armrest support. The locking component is formed with a tooth to engage removably the notch.

The armrest component is pivotable between first and second positions relative to the armrest support.

The locking component is movable relative to the armrest support to an engaging position, where the tooth of the locking component engages the notch in the armrest support to retain the armrest component at the first position.

The armrest device further includes a control component that has a control part extending through the slot in the armrest component toward the locking component. The control component is rotatable from a locking position, where the control part prevents movement of the locking component away from the engaging position, to an unlocking position, where the control part permits movement of the locking component away from the engaging position so as to permit movement of the armrest component between the first and second positions.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
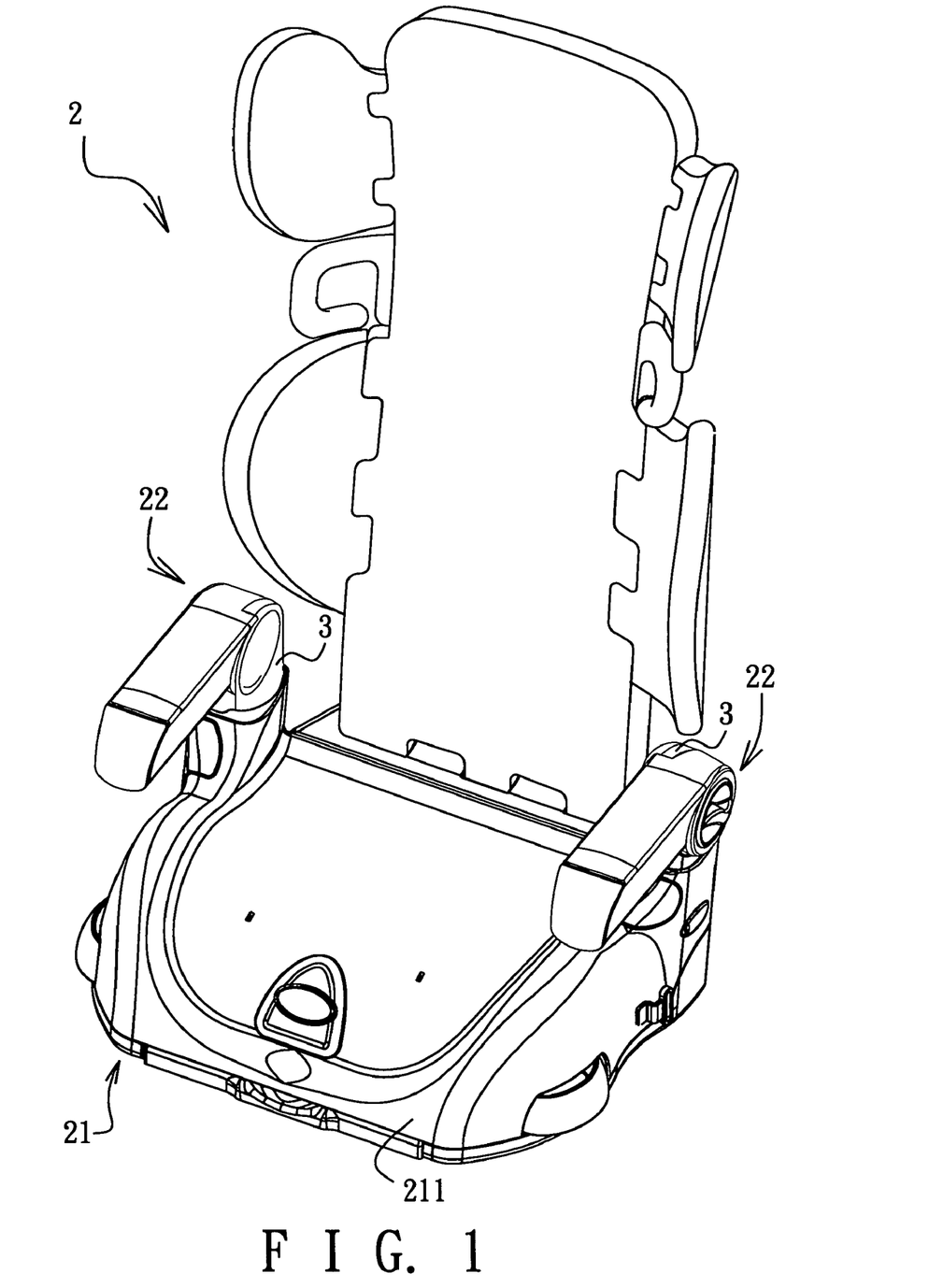
FIG. 1 is a perspective view of the preferred embodiment of a safety seat assembly according to the present invention.
Figure 2:
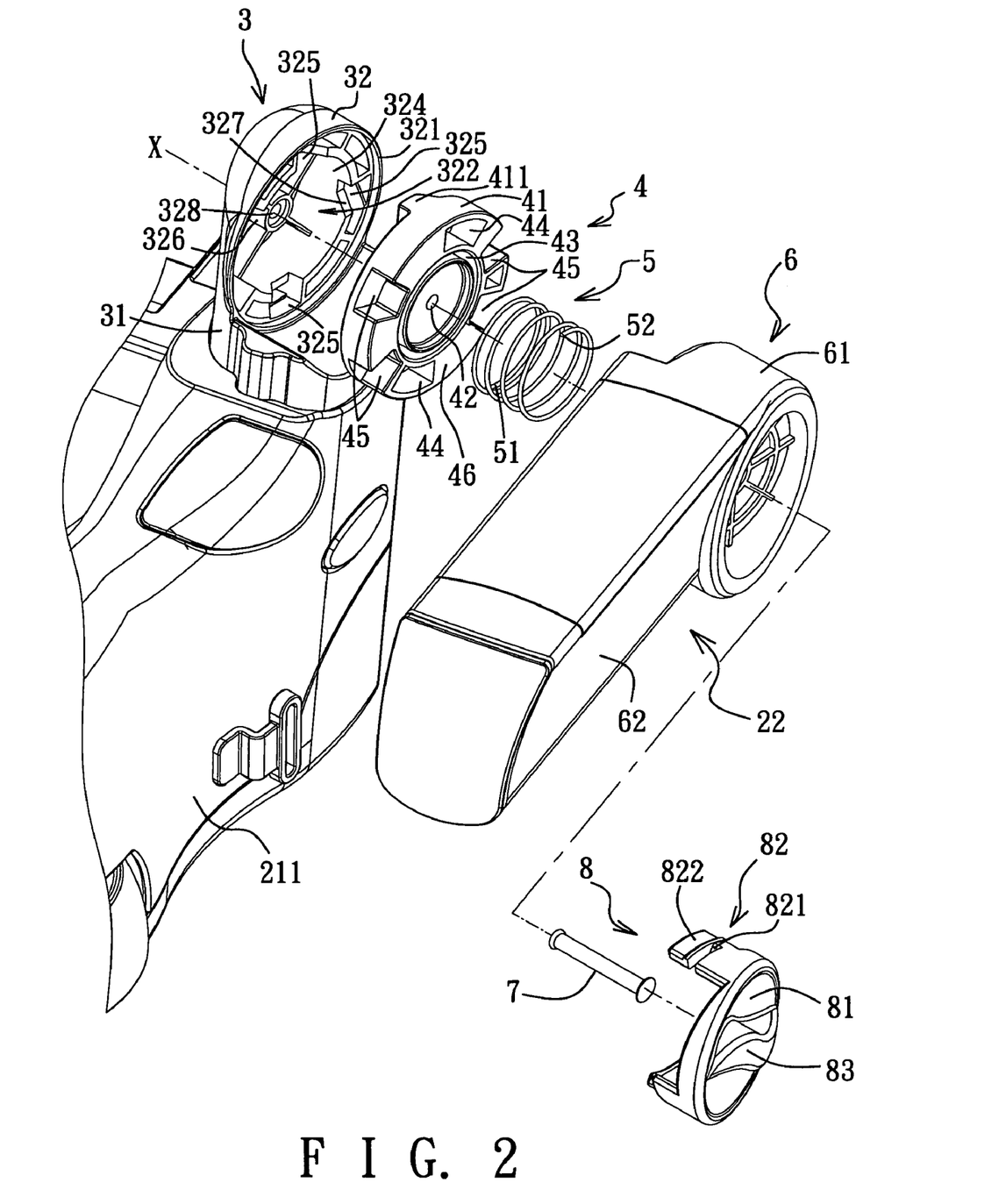
FIG. 2 is a fragmentary exploded perspective view of the preferred embodiment.

Referring to FIGS. 1 and 2, the preferred embodiment of a safety seat assembly 2 according to the present invention is shown to be in the form of a juvenile car safety seat. However, it should be apparent to those skilled in the art that the safety seat assembly of this invention is applicable to other types of seat assemblies that have an armrest component.

The safety seat assembly 2 comprises a seat body 21 and a pair of armrest devices 22.

The seat body 21 includes a seat portion 211 and a pair of armrest supports 3, each of which is fixed to a respective one of two lateral sides of the seat portion 211. The armrest devices 22 are connected pivotally and respectively to the armrest supports 3, and are pivotable relative to the seat body 21 about a pivot axis (X).

Since the left and right sets of the armrest device 22 and the corresponding armrest support 3 are identical in construction, only the right set will be described in detail hereinafter for the sake of brevity.

The armrest support 3 includes a connecting post 31 fixed to the seat portion 211, and a top seat 32 integrally formed on top of the connecting post 31.

Figure 3:
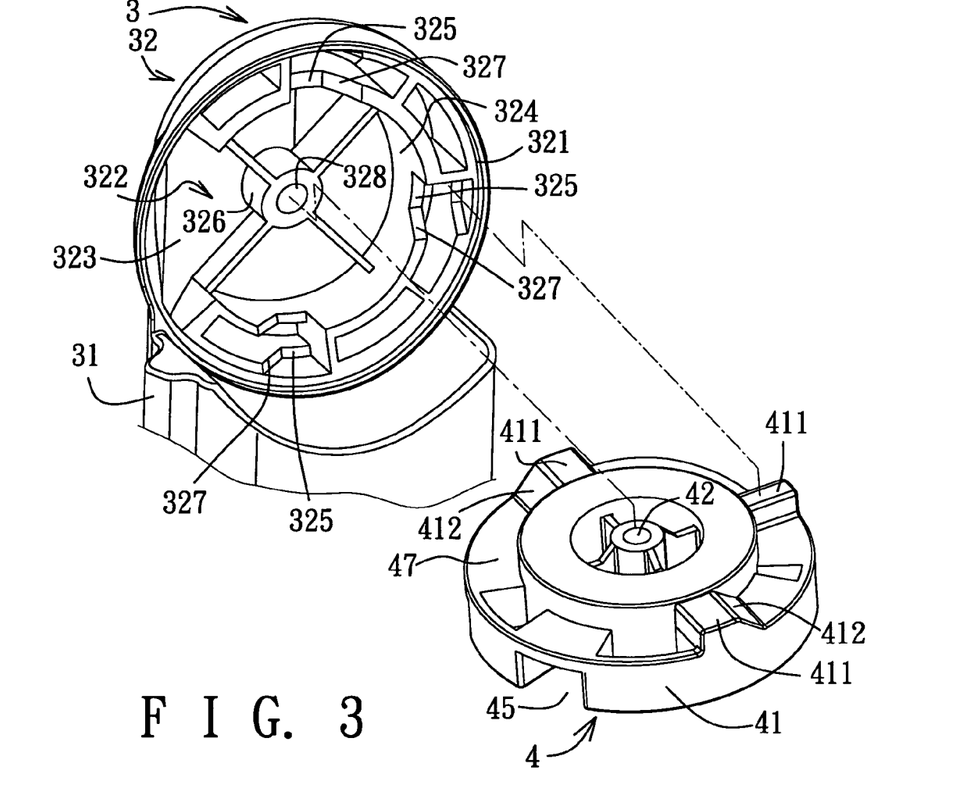
FIG. 3 is another fragmentary exploded perspective view to illustrate an armrest support and a locking component of the preferred embodiment.

Referring to FIGS. 2 and 3, the top seat 32 has a side surface 321 formed with a groove 322. The side surface 321 includes a base part 323 defining a bottom of the groove 322, and a peripheral part 324 extending from a periphery of the base part 323 and defining a periphery of the groove 322.

The top seat 32 is further formed with three angularly spaced apart wedged-shaped notches 325 disposed on the peripheral part 324 and in spatial communication with the groove 322, and an axle tube 326 extending from a center of the base part 323 in the same direction as the peripheral part 324 and spaced apart from the peripheral part 324. Each notch 325 has an inclined side 327. The axle tube 326 is formed with a pivot hole 328 extending in the direction of the pivot axis (X).

The armrest device 22 includes an armrest component 6 connected pivotally to the top seat 32 of the armrest support 3, a locking component 4 disposed between the armrest component 6 and the top seat 32, a biasing member 5 disposed between the locking component 4 and the armrest component 6, a pivot component 7 that extends through the armrest component 6, the locking component 4 and the top seat 32 so as to couple pivotally the armrest component 6 and the locking component 4 to the top seat 32, and a control component 8 disposed on one side of the armrest component 6 opposite to the locking component 4. The locking component 4 is coupled movably to the armrest component 6, is rotatable with the armrest component 6 relative to the armrest support 3, and is movable along the pivot component 7.

The locking component 4 includes a wheel body 41 that is formed with a pivot hole 42 extending in the direction of the pivot axis (X) and aligned with the pivot hole 328 in the top seat 32. The wheel body 41 has a first side face 46 opposite to the top seat 32 and formed with a ring-shaped insert groove 43 that surrounds the pivot hole 42, a diametrically opposite pair of coupling grooves 44 disposed radially outward of the insert groove 43, and four connecting grooves 45 also disposed radially outward of the insert groove 43.

The wheel body 41 further has a second side face 47 opposite to the first side face 46, disposed to confront the top seat 32, and formed with three angularly spaced apart wedge-shaped teeth 411 for engaging removably and respectively the wedge-shaped notches 325 in the top seat 32. Each tooth 411 has an inclined side 412 for sliding against the inclined side 327 of the corresponding notch 325, thereby resulting in movement of the locking component 4 relative to the top seat 32 along the pivot axis (X). In practice, the actual number of sets of the notches 325 and the teeth 411 may be fewer than or greater than 3.

As best shown in FIG. 2, in this embodiment, the biasing member 5 is a coil spring having a first end 51 received in the insert groove 43 in the first side face 46 of the locking component 4, and a second end 52 disposed to abut against the armrest component 6.

Figure 4:
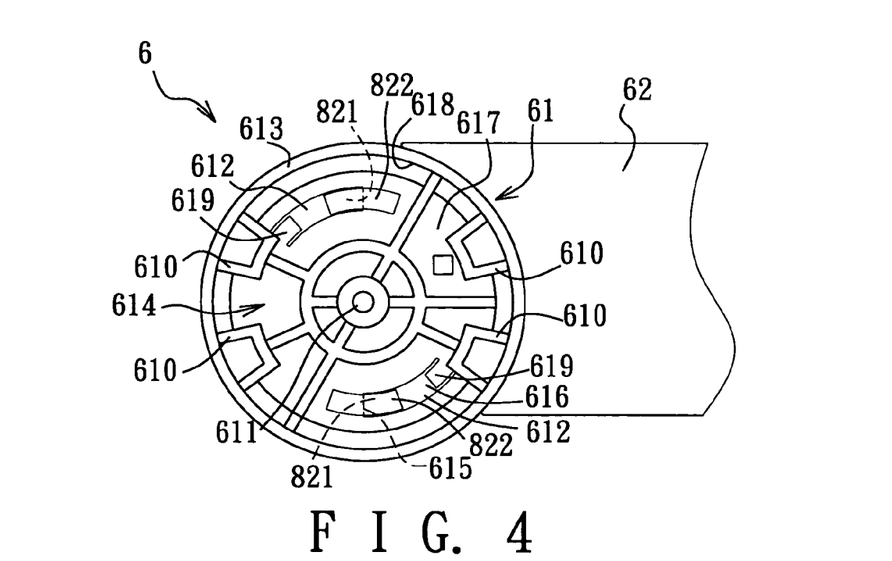
FIG. 4 is a fragmentary schematic side view to illustrate an armrest component of the preferred embodiment.

Referring to FIGS. 2 and 4, the armrest component 6 includes a coupling seat part 61 that is connected pivotally to the top seat 32 of the armrest support 3 and that is disposed between the locking component 4 and the control component 8, and an armrest part 62 that extends integrally from the coupling seat part 61.

The coupling seat part 61 is formed with a pivot hole 611 that extends in the direction of the pivot axis (X) and that is aligned with the pivot holes 42, 328, and a diametrically opposite pair of arc-shaped slots 612 that have curvature centers at the pivot hole 611. The coupling seat part 61 has one side 613 disposed to confront the top seat 32 and formed with a receiving groove 614 that is in spatial communication with the pivot hole 611 and the slots 612 and that cooperates with the groove 322 of the top seat 32 to receive the locking component 4.

Each of the slots 612 has opposite engaging and disengaging slot ends 615, 616. The side 613 of the coupling seat part 61 has a base face 617 that defines a bottom of the receiving groove 614 and that has the second end 52 of the biasing member 5 hooked thereto, and a peripheral face 618 extending from a periphery of the base face 617 toward the top seat 32 to define a periphery of the receiving groove 614.

The coupling seat part 61 is further formed with a pair of stops 619, each of which projects into the disengaging slot end 616 of a respective one of the arc-shaped slots 612, and four connecting projections 610 that project from the base face 617 and that are connected to the peripheral face 618. The connecting projections 610 respectively engage the connecting grooves 45 in the locking component 4 such that the locking component 4 is rotatable with the armrest component 6 relative to the top seat 32 and such that the locking component 4 is movable along the pivot axis (X) relative to the top seat 32.

In this embodiment, the pivot component 7 is a rivet that extends through the pivot holes 611, 42, 328, as well as the biasing member 5.

The control component 8 includes a knob part 81 disposed on one side of the coupling seat part 61 opposite to the locking component 4, a pair of control parts 82, each of which extends from the knob part 81 parallel to the pivot axis (X), through and movably along a respective one of the arc-shaped slots 612, and toward the locking component 4, and a control rib 83 projecting from one side of the knob part 81 opposite to the control parts 82 to facilitate user manipulation of the control component 8. Each of the control parts 82 includes a limiting segment 821 connected to the knob part 81 and movably disposed in the respective arc-shaped slot 612, and a positioning segment 822 connected to the limiting segment 821, disposed in the receiving groove 614, and disposed to abut against the locking component 4.

Figure 5:
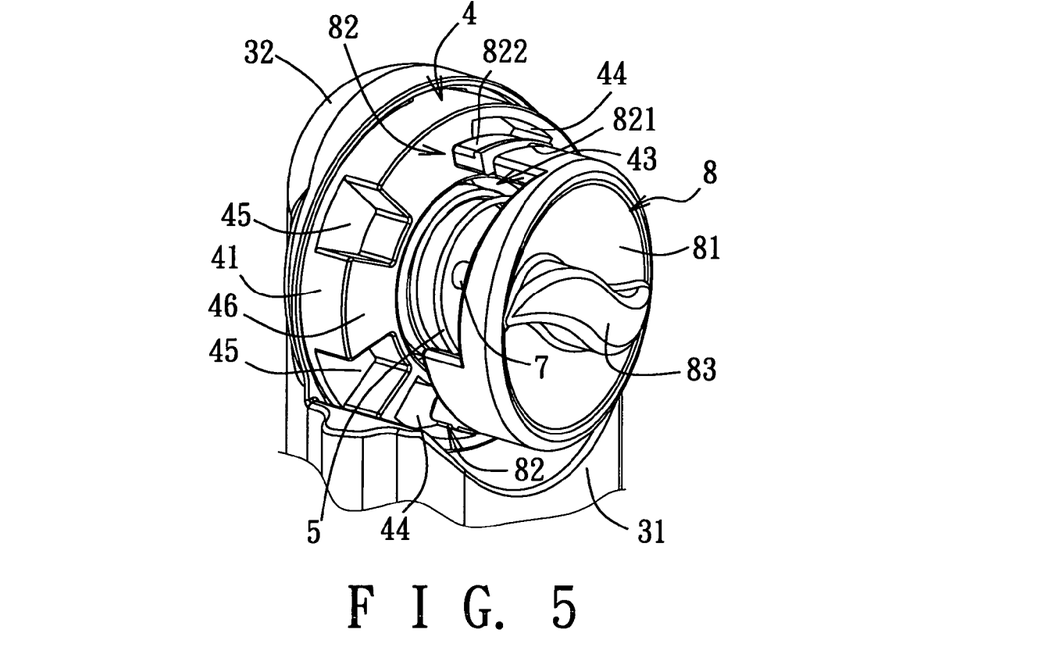
FIG. 5 is a fragmentary assembled perspective view of the preferred embodiment, illustrating a control component when disposed at a locking position.
Figure 6:
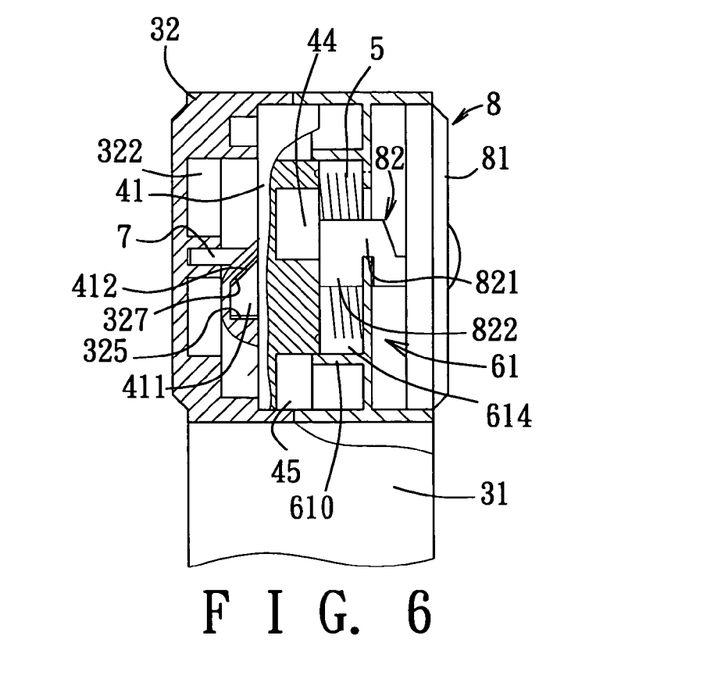
FIG. 6 is a fragmentary, partly sectional, schematic side view of the preferred embodiment.
Figure 9:
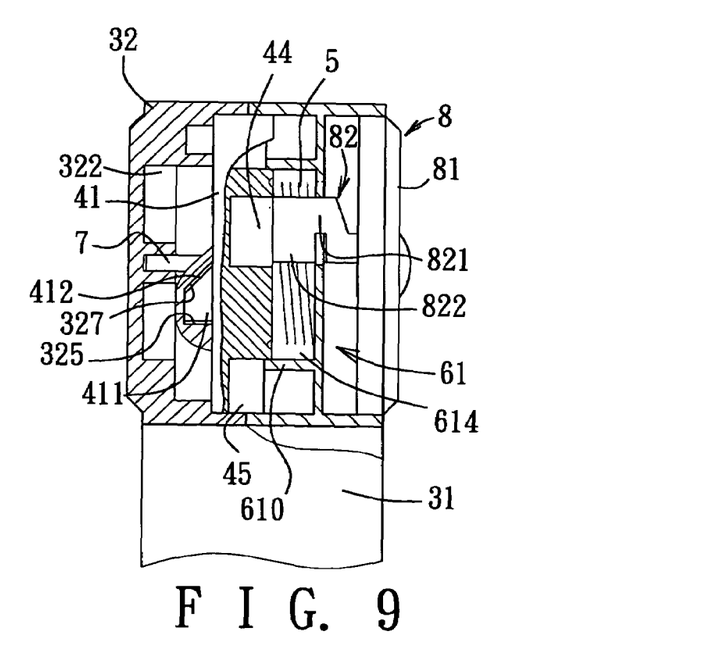
FIG. 9 is a view similar to FIG. 6, but showing the control component when disposed at the unlocking position.
Figure 10:
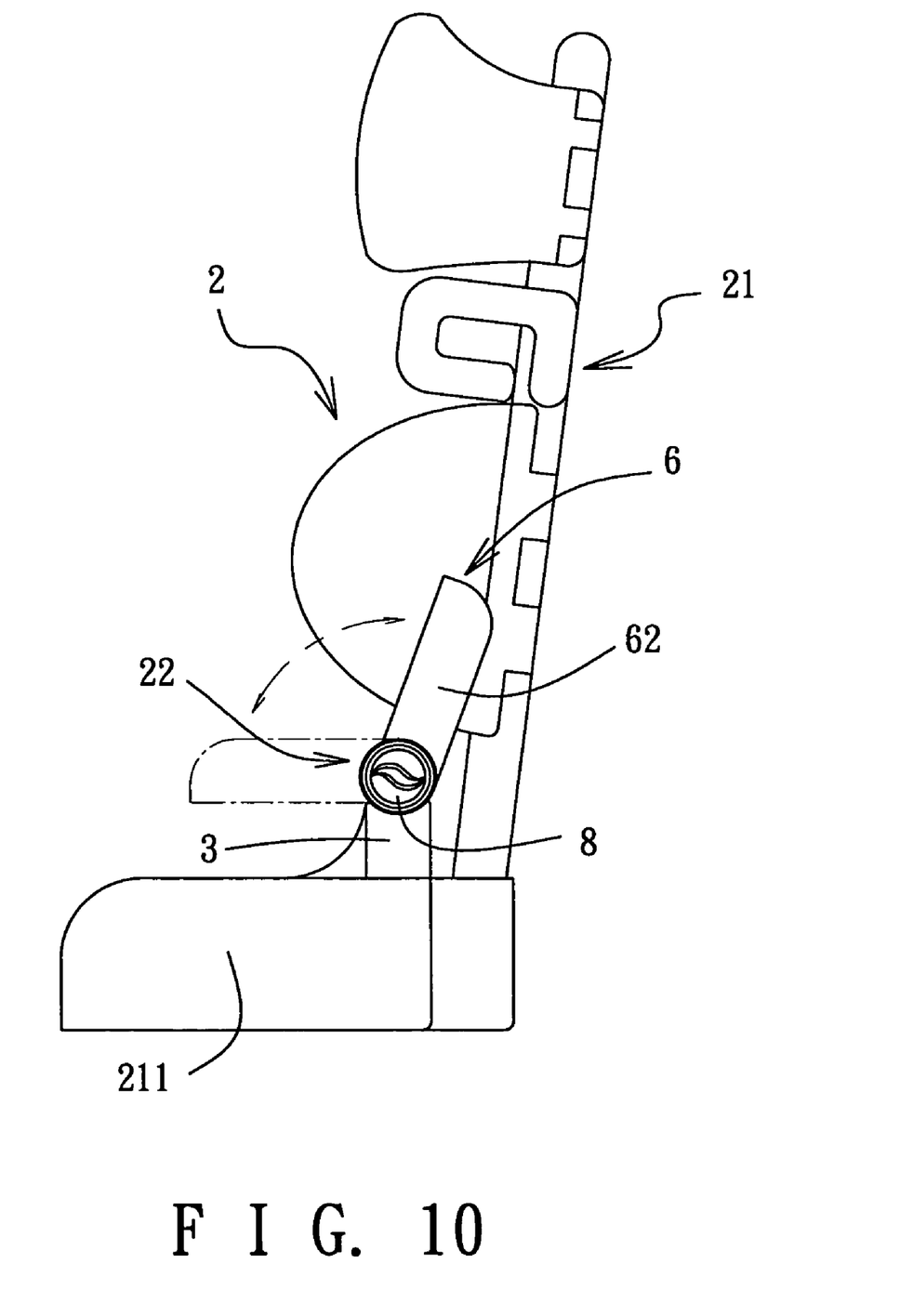
FIG. 10 is a schematic side view of the preferred embodiment to illustrate pivoting movement of an armrest component from a first (lowered) position to a second (raised) position.

The armrest component 6 is pivotable0 between a first (lowered) position (see FIG. 1) and a second (raised) position relative to the armrest support 3 (see FIG. 10). The locking component 4 is movable relative to the top seat 32 along the pivot axis (X) to an engaging position (see FIG. 6), where the teeth 411 of the locking component 4 engage the notches 325 of the top seat 32 to retain the armrest component 6 at the first position. The control component 8 is operable between a locking position (see FIGS. 4, 5 and 6), where the control component 8 prevents movement of the locking component 4 away from the engaging position, and an unlocking position (see FIGS. 7 to 12), where the control component 8 permits movement of the locking component 4 away from the engaging position so as to permit movement of the armrest component 6 between the first and second positions.

In particular, referring to FIGS. 1, 4, 5 and 6, when the armrest component 6 is disposed at the first position, and the control component 8 is rotated to the locking position, the limiting segments 821 of the control parts 82 are disposed at the engaging slot ends 615 of the slots 612 of the coupling seat part 61, the positioning segments 822 of the control parts 82 abut against the first side face 46 of the locking component 4, and the teeth 411 on the second side face 47 of the locking component 4 engage the notches 325 in the top seat 32 of the armrest support 3. Since relative movement between the teeth 411 and the notches 325 is prevented in view of the abutment of the positioning segments 822 of the control parts 82 with the first side face 46 of the locking component 4, both the locking component 4 and the armrest component 6 are not pivotable relative to the armrest support 3 at this time.

Figure 7:
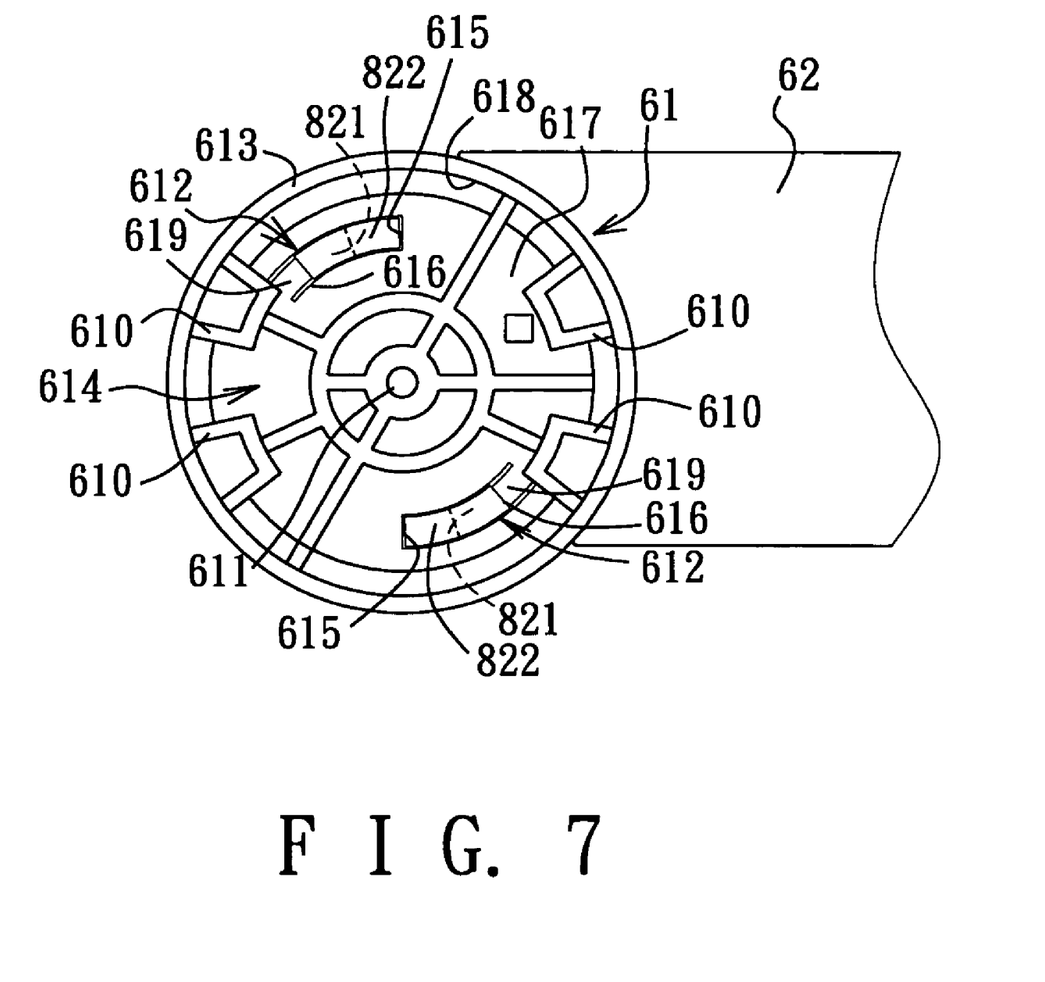
FIG. 7 is a view similar to FIG. 4, but showing the control component when disposed at an unlocking position.
Figure 8:
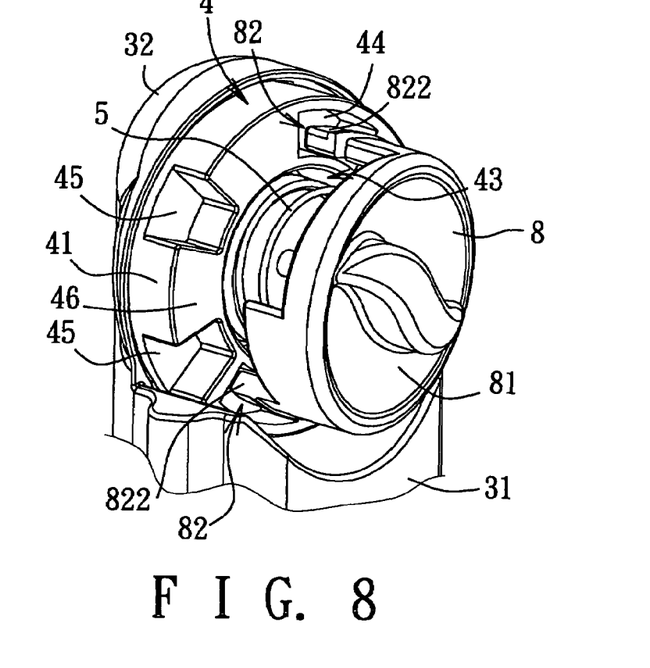
FIG. 8 is a view similar to FIG. 5, but showing the control component when disposed at the unlocking position.

Referring to FIGS. 7, 8 and 9, when it is desired to pivot the armrest component 6 from the first position to the second position, the control component 8 is rotated from the locking position to the unlocking position. When the control component 8 is at the unlocking position, the limiting segments 821 of the control parts 82 are moved to the disengaging slot ends 616 of the slots 612 of the coupling seat part 61 and abut against the stops 619. The positioning segments 822 of the control parts 82 are aligned with the coupling grooves 44 at this time, and cease to abut against the first side face 46 of the locking component 4.

Figure 11:
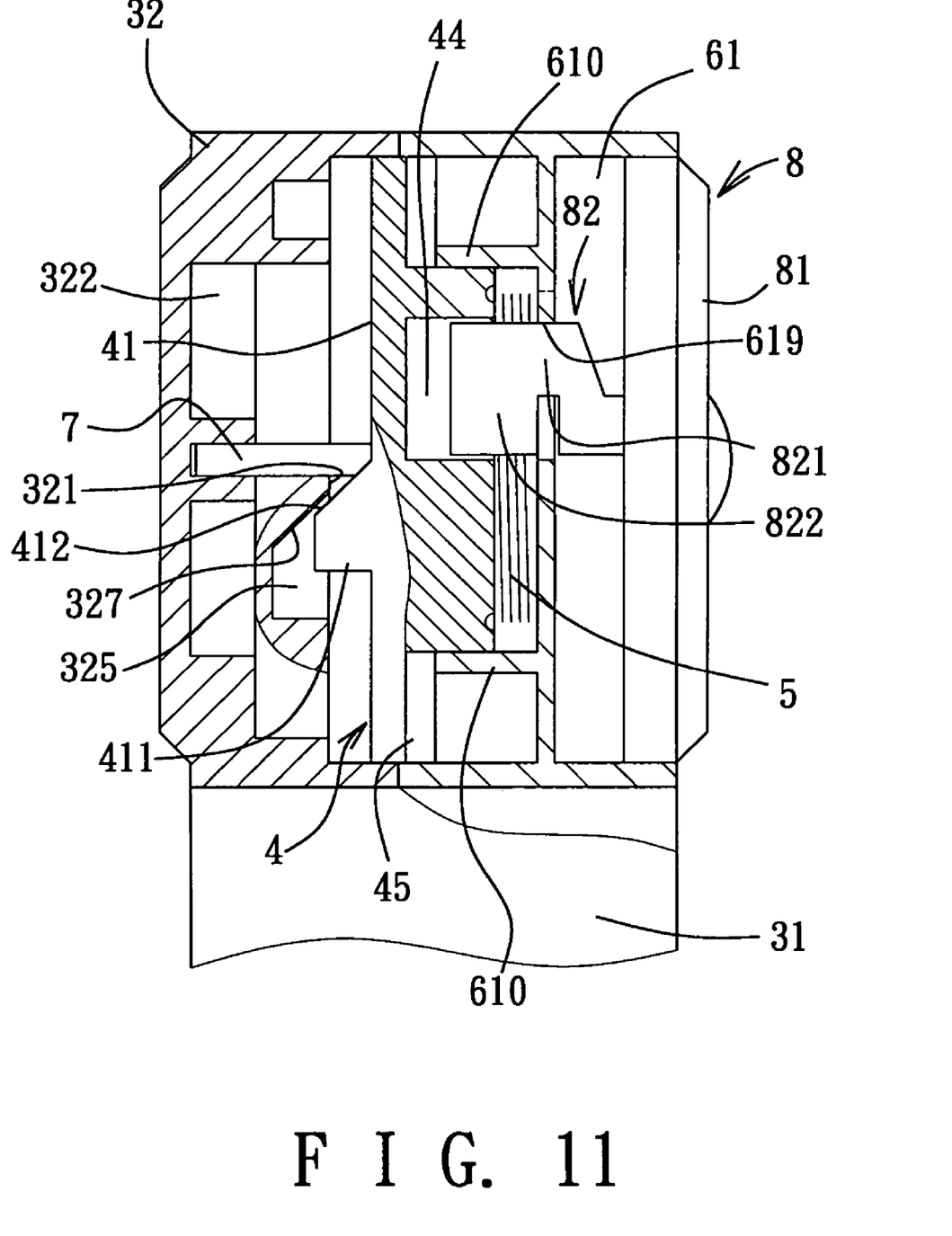
FIG. 11 is a view similar to FIG. 9, but showing movement of a locking component away from an engaging position.
Figure 12:
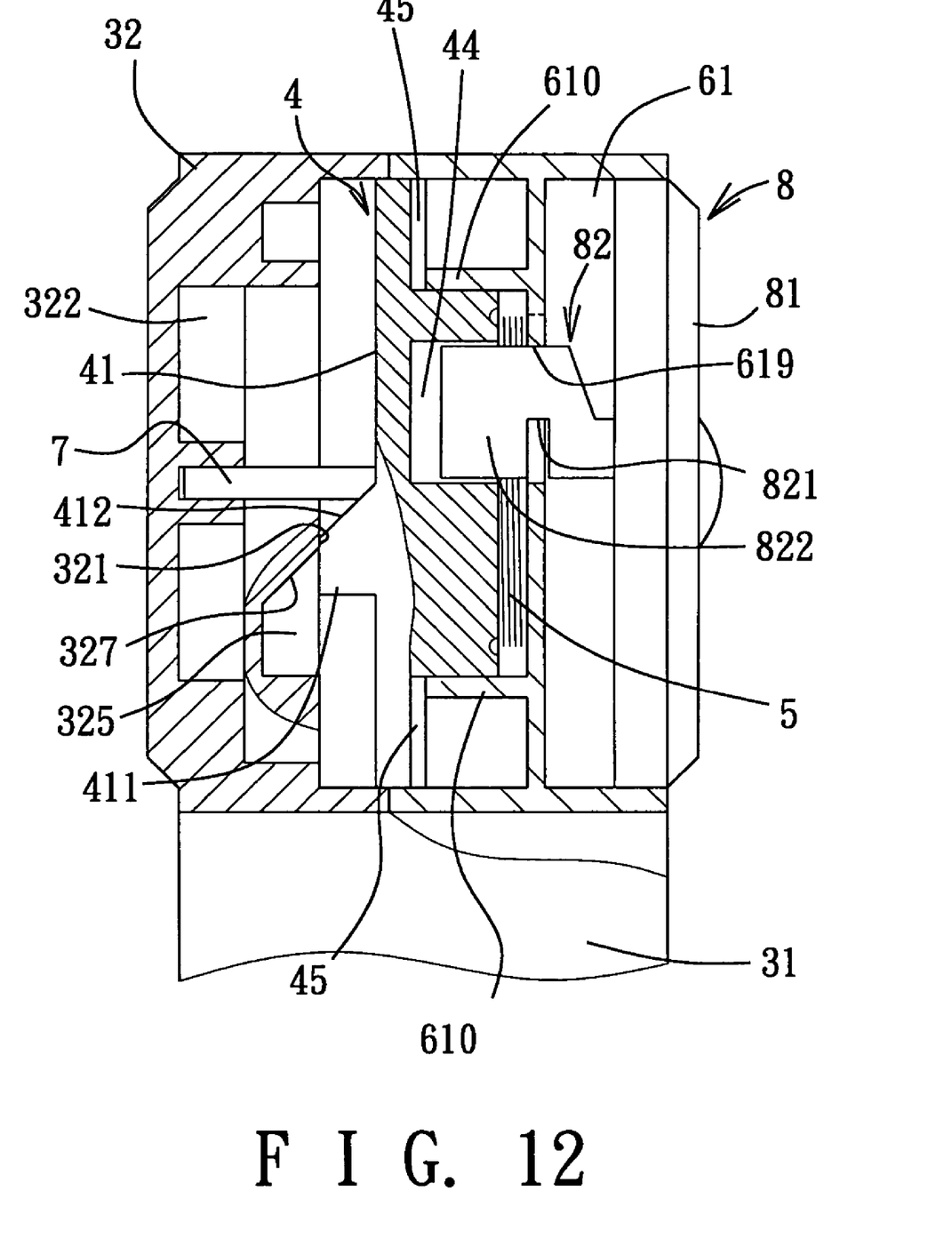
FIG. 12 is a view similar to FIG. 11, but showing the locking component when moved away from the engaging position.

Thereafter, referring to FIGS. 10, 11 and 12, the armrest component 6 is pivoted about the pivot axis (X) to move the armrest component 6 from the first position to the second position. In view of the engagement between the connecting grooves 45 and the connecting projections 610, the locking component 4 rotates synchronously with the coupling seat part 61 of the armrest component 6. As the locking component 4 rotates relative to the top seat 32, the inclined sides 412 of the teeth 411 slide against the inclined sides 327 of the notches 325 such that the locking component 4 moves along the pivot axis (X) away from the top seat 32, thereby enabling the positioning segments 822 of the control parts 82 to extend into the coupling grooves 44 for preventing relative rotation between the control component 8 and the locking component 4, and thereby enabling the connecting projections 610 to slide further into the connecting grooves 45, as best shown in FIG. 11. When the teeth 411 are moved out of the notches 325, the teeth 411 abut against the side surface 321 of the top seat 32, and the biasing member 5 is compressed between the locking component 4 and the coupling seat part 61 and accumulates a restoring force, as best shown in FIG. 12.

Referring again to FIGS. 1, 8 and 9, to restore the armrest component 6 to the first position, the armrest part 62 is operated to pivot the armrest component 6 about the pivot axis (X) from the second position to the first position. When the armrest component 6 approaches the first position, in view of the restoring force accumulated by the biasing member 5, the locking component 4 is biased toward the top seat 32 to enable the teeth 411 to slide into the notches 325, thereby disposing the locking component 4 at the engaging position. At the same time, the limiting segments 821 of the control parts 82 are moved out of the coupling grooves 44 so that the control component 8 can be rotated relative to the locking component 4 from the unlocking position to the locking position (see FIGS. 4, 5 and 6) when the armrest component 6 is at the first position.

In sum, this invention provides a safety seat assembly 2 including an armrest device 22 having an armrest component 6 connected pivotally to an armrest support 3 of a seat body 21, and a locking component 4 disposed between the armrest component 6 and the armrest support 3, coupled movably to the armrest component 6, and rotatable with the armrest component 6 relative to the armrest support 3 between first and second positions. The locking component 4 is movable to engage the armrest support 3 for retaining the armrest component 6 at the first (lowered) position. A control component 8 of the armrest device 22 is operable between a locking position for preventing disengagement between the locking component 4 and the armrest support 3, and an unlocking position for permitting disengagement between the locking component 4 and the armrest support 3. Through the locking and control components 4, 8, unintended pivoting movement of the armrest component 6 from the first position can be avoided to ensure safety. In addition, by simply rotating the control component 8, the armrest component 6 can be unlocked from the first position and subsequently pivoted to the second (raised) position to facilitate movement into and out of the seat body 21. Further, through the restoring force accumulated in the biasing member 5 and the abutment of the teeth 411 on the locking component 4 against the side surface 321 of the top seat 32, forces for retaining the armrest component 6 at the second position can be generated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:
1. A safety seat assembly comprising:
a seat body including a seat portion and an armrest support disposed on a lateral side of said seat portion; and
an armrest device including an armrest component connected pivotally to said armrest support, and a locking component disposed between said armrest component and said armrest support, coupled movably to said armrest component, and rotatable with said armrest component relative to said armrest support;
wherein said armrest component is pivotable between first and second positions relative to said armrest support;
wherein said locking component is movable relative to said armrest support to an engaging position, where said locking component engages said armrest support to retain said armrest component at the first position; and
wherein said armrest device further includes a control component operable between a locking position, where said control component prevents movement of said locking component away from the engaging position, and an unlocking position, where said control component permits movement of said locking component away from the engaging position so as to permit movement of said armrest component between the first and second positions.

2. The safety seat assembly as claimed in claim 1, wherein said control component extends through said armrest component toward said locking component, and
wherein said locking component includes a wheel body formed with a coupling groove that permits extension of said control component therein when said control component is at the unlocking position.

3. The safety seat assembly as claimed in claim 1, wherein said armrest support has a side surface that confronts said locking component and that is formed with a wedge-shaped notch, and wherein said locking component includes a wheel body disposed between said armrest component and said armrest support and coupled movably to said armrest component, said wheel body being formed with a wedge-shaped tooth that engages removably said wedge-shaped notch.

4. The safety seat assembly as claimed in claim 1, wherein said armrest component includes a coupling seat part connected pivotally to said armrest support and disposed between said locking component and said control component, and an armrest part that extends integrally from said coupling seat part.

5. The safety seat assembly as claimed in claim 4, wherein said coupling seat part is formed with an arc-shaped slot therethrough, and
    wherein said control component includes a knob part disposed on one side of said coupling seat part opposite to said locking component, and a control part extending from said knob part, through and movably along said arc-shaped slot, and toward said locking component.

6. The safety seat assembly as claimed in claim 5, wherein said control part includes a limiting segment connected to said knob part and movably disposed in said arc-shaped slot, and a positioning segment connected to said limiting segment and disposed to abut against said locking component when said control component is at the locking position.

7. The safety seat assembly as claimed in claim 6, wherein said coupling seat part is further formed with a stop that projects into said arc-shaped slot and that prevents removal of said positioning segment of said control part from said coupling seat part via said arc-shaped slot.

8. The safety seat assembly as claimed in claim 5, wherein said locking component includes a wheel body formed with a coupling groove that permits extension of said positioning segment of said control part therein when said control component is at the unlocking position.

9. The safety seat assembly as claimed in claim 1, wherein said armrest device further includes a pivot component that extends through said armrest component, said locking component and said armrest support and that couples pivotally said armrest component and said locking component to said armrest support, said locking component being movable along said pivot component.

10. The safety seat assembly as claimed in claim 9, wherein said locking component is formed with a connecting groove, and said armrest component is formed with a connecting projection to engage said connecting groove such that said locking component is movable along said pivot component.

11. The safety seat assembly as claimed in claim 1, wherein said armrest device further includes a spring disposed between said locking component and said armrest component.

12. The safety seat assembly as claimed in claim 1, wherein said control component is rotatable between the locking and unlocking positions.

13. A safety seat assembly comprising:
    a seat body including a seat portion and an armrest support disposed on a lateral side of said seat portion, said armrest support having a side surface formed with a notch; and
    an armrest device including an armrest component connected pivotally to said armrest support and formed with a slot therethrough, and a locking component disposed between said armrest component and said armrest support, coupled movably to said armrest component, and rotatable with said armrest component relative to said armrest support, said locking component being formed with a tooth to engage removably said notch;
    wherein said armrest component is pivotable between first and second positions relative to said armrest support;
    wherein said locking component is movable relative to said armrest support to an engaging position, where said tooth of said locking component engages said notch in said armrest support to retain said armrest component at the first position; and
    wherein said armrest device further includes a control component that has a control part extending through said slot in said armrest component toward said locking component, said control component being rotatable from a locking position, where said control part prevents movement of said locking component away from the engaging position, to an unlocking position, where said control part permits movement of said locking component away from the engaging position so as to permit movement of said armrest component between the first and second positions.

14. The safety seat assembly as claimed in claim 13, wherein said control component further includes a knob part disposed on one side of said armrest component opposite to said locking component and connected to said control part, and a control rib projecting from one side of said knob part opposite to said coupling seat part.

15. The safety seat assembly as claimed in claim 14, wherein said control part includes a limiting segment connected to said knob part and movably disposed in said slot, and a positioning segment connected to said limiting segment and disposed to abut against said locking component when said control component is at the locking position.

16. The safety seat assembly as claimed in claim 13, wherein said locking component includes a wheel body formed with a coupling groove that permits extension of said control part of said control component therein when said control component is at the unlocking position.

17. The safety seat assembly as claimed in claim 13, wherein said notch in said armrest support is wedge-shaped, and said tooth on said locking component is wedge-shaped.

18. The safety seat assembly as claimed in claim 13, wherein said armrest device further includes a pivot component that extends through said armrest component, said locking component and said armrest support and that couples pivotally said armrest component and said locking component to said armrest support, said locking component being movable along said pivot component.

19. The safety seat assembly as claimed in claim 18, wherein said locking component is formed with a connecting groove, and said armrest component is formed with a connecting projection to engage said connecting groove such that said locking component is movable along said pivot component.

20. The safety seat assembly as claimed in claim 13, wherein said armrest device further includes a spring disposed between said locking component and said armrest component.

21. The safety seat assembly as claimed in claim 13, wherein said armrest component is further formed with a stop that projects into said slot and that prevents removal of said control part from said armrest component via said slot.

* * * * *